(12) United States Patent
Lee et al.

(10) Patent No.: US 11,139,499 B2
(45) Date of Patent: Oct. 5, 2021

(54) MANUFACTURING APPARATUS OF MEMBRANE ELECTRODE ASSEMBLY WITH EXCELLENT MASS TRANSFER CHARACTERISTICS AND DURABILITY, AND MANUFACTURING METHOD USING THE SAME

(71) Applicants: Hyundai Motor Company, Seoul (KR); Kia Motors Corporation, Seoul (KR)

(72) Inventors: Woo Jin Lee, Seoul (KR); Min Jin Kim, Seoul (KR); Ki Sub Lee, Gyeonggi-do (KR); Su Won Seol, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 9 days.

(21) Appl. No.: 16/213,735

(22) Filed: Dec. 7, 2018

(65) Prior Publication Data

US 2019/0372143 A1    Dec. 5, 2019

(30) Foreign Application Priority Data

Jun. 1, 2018    (KR) .................. 10-2018-0063309

(51) Int. Cl.
*H01M 8/1004*    (2016.01)
*H01M 4/88*    (2006.01)
*H01M 8/1018*    (2016.01)

(52) U.S. Cl.
CPC ......... *H01M 8/1004* (2013.01); *H01M 4/881* (2013.01); *H01M 2008/1095* (2013.01)

(58) Field of Classification Search
CPC .......................... H01M 4/881; H01M 8/1004
See application file for complete search history.

(56) References Cited

U.S. PATENT DOCUMENTS

| | | | | |
|---|---|---|---|---|
| 2002/0054472 A1* | 5/2002 | Ishikawa | ............... | H01G 11/72 361/502 |
| 2013/0337360 A1* | 12/2013 | Mahoney | ............ | H01M 8/2404 429/465 |
| 2017/0012313 A1* | 1/2017 | Inoue | .................. | H01M 8/1027 |

FOREIGN PATENT DOCUMENTS

| | | |
|---|---|---|
| JP | 2005-183182 A | 7/2005 |
| JP | 5295554 B2 | 9/2013 |
| JP | 2014-099412 A | 5/2014 |
| JP | 5741610 B2 | 7/2015 |
| KR | 10-2009-0019175 A | 2/2009 |
| KR | 10-1154217 B1 | 6/2012 |
| KR | 10-1321125 B1 | 10/2013 |
| KR | 2016-0011487 A | 2/2016 |
| KR | 10-1621693 B1 | 5/2016 |
| KR | 10-2017-0112542 A | 10/2017 |

(Continued)

*Primary Examiner* — Michael N Orlando
*Assistant Examiner* — John Blades
(74) *Attorney, Agent, or Firm* — Mintz Levin Cohn Ferris Glovsky and Popeo, P.C.; Peter F. Corless

(57) ABSTRACT

Disclosed are an apparatus for manufacturing a membrane electrode assembly to provide excellent mass transfer characteristics and durability and a manufacturing method using the same. A porosity gradient may be continuously imparted to electrodes of the membrane electrode assembly in a thickness direction thereby improving reactivity with external gas and transfer of internal ions.

13 Claims, 5 Drawing Sheets

(56) References Cited

FOREIGN PATENT DOCUMENTS

| KR | 10-2017-0115191 A | 10/2017 |
|---|---|---|
| KR | 10-2017-0118739 A | 10/2017 |
| KR | 10-1785180 B1 | 10/2017 |
| WO | 2014/122936 A1 | 8/2014 |
| WO | 2016/132806 A1 | 8/2016 |

\* cited by examiner

PRIOR ART

PRIOR ART

MANUFACTURING APPARATUS OF MEMBRANE ELECTRODE ASSEMBLY WITH EXCELLENT MASS TRANSFER CHARACTERISTICS AND DURABILITY, AND MANUFACTURING METHOD USING THE SAME

CROSS-REFERENCE TO RELATED APPLICATION

This application claims under 35 U.S.C. § 119(a) the benefit of priority to Korean Patent Application No. 10-2018-0063309 filed on Jun. 1, 2018, the entire contents of which are incorporated herein by reference.

TECHNICAL FIELD

The present invention relates to an apparatus of manufacturing a membrane electrode assembly and a manufacturing method using the same. The membrane electrode assembly may have excellent mass transfer characteristics and durability and improved reactivity and transfer of substances by continuously imparting a porosity gradient to electrodes in a thickness direction.

BACKGROUND

A fuel cell stack typically generates substantial electricity and has a structure in which dozens or hundreds of unit cells including membrane electrode assemblies (MEA) and separators are stacked.

The membrane electrode assembly includes a polymer electrolyte membrane and an anode and a cathode arranged with the polymer electrolyte membrane interposed therebetween. The anode (also referred to as a hydrogen electrode, a fuel electrode or an oxidation electrode) and the cathode (also referred to as an air electrode, an oxygen electrode or a reduction electrode) have been typically formed by adsorbing a catalyst layer including nanometer scale catalyst particles onto an electrode substrate formed of carbon paper or carbon cloth.

For example, as shown in FIG. 1, in the related arts, electrodes and an electrolyte membrane fed by electrode feed rollers 1 and an electrolyte membrane feed roller 2 are compressed by thermocompression rollers 4 and thus form the membrane electrode assembly. In the membrane electrode assembly manufactured by the above-described method, porosity of the electrodes may be adjusted according to a kind of a catalyst or a size of catalyst particles or by post-processing, however, porosity of the electrodes may not be adjusted locally, thus causing problems which will be mentioned below.

FIG. 2A illustrates a membrane electrode assembly in which porosity of electrodes is increased. In this case, outer parts of the electrodes k, l reacting with hydrogen gas and oxygen gas and performing mass transfer may have high efficiency, but porosity of inner parts of the electrodes k, l is excessively increased also and thus durability and rigidity of the membrane electrode assembly may be lowered. Further, continuity of a passage, along which hydrogen ions are effectively moved, may be lowered.

FIG. 2B illustrates a membrane electrode assembly in which porosity of electrodes k, l is decreased. In this case, the density of the insides of the electrodes k, l is high and thus durability and rigidity of the membrane electrode assembly are raised and hydrogen ions are effectively moved. However, porosity of the outer parts of the electrodes k, l is excessively decreased also and thus mass transfer may not be normally performed and thus reactivity of the membrane electrode assembly may be reduced.

A membrane electrode assembly manufactured by the conventional manufacturing method may not locally adjust porosity of the electrodes, and a fuel cell using the membrane electrode assembly may not provide electrodes which have durability and increase mobility of hydrogen ions internally while increasing reactivity to hydrogen gas and oxygen gas externally.

SUMMARY OF THE INVENTION

In preferred aspects, the present invention provides an apparatus for manufacturing a membrane electrode assembly, which may have increased reactivity of gas at the outside of electrodes and increased durability of the electrodes and mobility of ions at the inside of the electrodes.

In one aspect, provided is an apparatus of manufacturing a membrane electrode assembly with improved mass transfer characteristics. The apparatus may include: a feeding part, an elongating part, a thermal compressing part and a winding part. Preferably, the feeding part may include a cathode feeding roller configured to feed a first release paper to which a cathode material is attached; an anode feeding roller configured to feed a second release paper to which a anode material is attached; and an electrolyte membrane feeding roller interposed between the cathode feeding roller and the anode feeding roller configured to feed an electrolyte membrane. Preferably, the elongating part may include a pair of first cathode elongating rollers configured to receive a first release paper from the cathode feeding roller of the feeding part; a pair of second cathode elongating rollers configured to receive a first release paper from the pair of first cathode elongating rollers; a pair of first anode elongating rollers configured to receive a second release paper from the anode feeding rollers of the feeding part; and a pair of second anode elongating rollers configured to receive a second release paper from the pair of first anode elongating rollers. Preferably, the thermal compressing part may include a pair of thermal compressing rollers configured to form the membrane electrode assembly by thermally compressing the cathode material attached on the first release paper received from the second cathode elongating roller, the anode material attached on the second release paper received from the second anode elongating roller and the electrolyte membrane fed from the electrolyte membrane feeding roller. Preferably, the winding part may include a cathode winding roller configured to remove a first release paper from the membrane electrode assembly received from the thermal compressing part; an anode winding roller configured to remove a second release paper from the membrane electrode assembly received from the thermal compressing part; and an membrane electrode assembly winding roller configured to wind the membrane electrode assembly on which first release paper and second release paper have been removed.

The cathode material in the feeding part may be adhered to the surface facing the electrolyte membrane of the first release paper, and the anode material may be adhered to the surface facing the electrolyte membrane of the second release paper.

In another preferred embodiment, the first release paper in the feeding part may be a porous release film and the second release paper in the feeding part may be a porous release film. The first porous release film and the second porous release film may be same or different.

The pair of first cathode elongating rollers and the pair of first anode elongating rollers in the elongating part may be driven at a rotational speed V1, and the pair of second cathode elongating rollers and the pair of second anode elongating rollers may be driven at a rotational speed V2.

Preferably, a speed ratio (V1/V2) of the rotational speed V1 to the rotational speed V2 may be suitably about 1/1.2 to 1/10.0.

In another aspect, provided is a method of manufacturing a membrane electrode assembly. The method may include: drawing release papers provided with electrodes adhered thereto through draft rollers to increase porosity of the electrodes, transferring the electrodes to an electrolyte membrane by compressing the electrodes and the electrolyte membrane after the electrolyte membrane is located so as to face the electrodes adhered to the release papers, and forming the membrane electrode assembly, having the electrodes with a porosity gradient in a thickness direction, by removing the release papers from the electrodes, wherein porosity of the electrodes at the interfaces between the electrolyte membrane and the electrodes is decreased in the transfer of the electrodes to the electrolyte membrane. Preferably, heat may be applied when the electrodes and the electrolyte membrane are compressed.

The term "thickness direction" is meant by a cross-sectional direction of an object (e.g., electrode), that may be perpendicular or substantially perpendicular from a surface (e.g., a surface having the largest area) of the object.

The release papers may suitably include one or more selected from the group consisting of polytetrafluoroethylene (PTFE), expended polytetrafluoroethylene (e-PTFE), polyethylene terephthalate (PET), polyethylene naphthalate (PEN), polyimide (PI) and polyoxymethylene (POM).

Preferably, in the drawing of the release papers, the release papers may be drawn in a length direction (a machine direction (MD)).

Preferably, in the drawing of the release papers, the release papers may be drawn by the draft rollers driven at a rotational speed V1 and the draft rollers are driven at a rotational speed V2.

Preferably, a speed ratio (V1/V2) of the rotational speed V1 to the rotational speed V2 may be about 1/1.2 to 1/10.0.

Preferably, in the drawing of the release papers, an elongation ratio of the release papers may be about 1:1.2 to 1:10.0.

Preferably, in the formation of the membrane electrode assembly, porosity of outer surfaces of the electrodes, from which the release papers are removed, may be greater than porosity of inner surfaces of the electrodes contacting the electrolyte membrane.

Preferably, in the formation of the membrane electrode assembly, an average pore size of the outer surfaces of the electrodes, from which the release papers are removed, may be about 40 nm to 200 nm, and an average pore size of the inner surfaces of the electrodes contacting the electrolyte membrane may be about 1 nm to 60 nm.

Preferably, in the formation of the membrane electrode assembly, the electrodes may have a continuous porosity gradient in a thickness direction.

Preferably, porosity of regions of the electrodes contacting the release papers may maintain an increased state, in the transfer of the electrodes to the electrolyte membrane.

Preferably, the manufacturing method may further include applying a catalyst slurry to surfaces of the electrolyte membrane, before the transfer of the electrodes to the electrolyte membrane.

Preferably, a catalyst material of the applied catalyst slurry may be the same as a catalyst material of the electrodes.

Preferably, porosity of the electrodes may be increased in a direction from regions of the electrodes contacting the electrolyte membrane and regions of the electrodes contacting the release papers, in the transfer of the electrodes to the electrolyte membrane.

Further provided is a membrane electrode assembly manufactured by the method described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
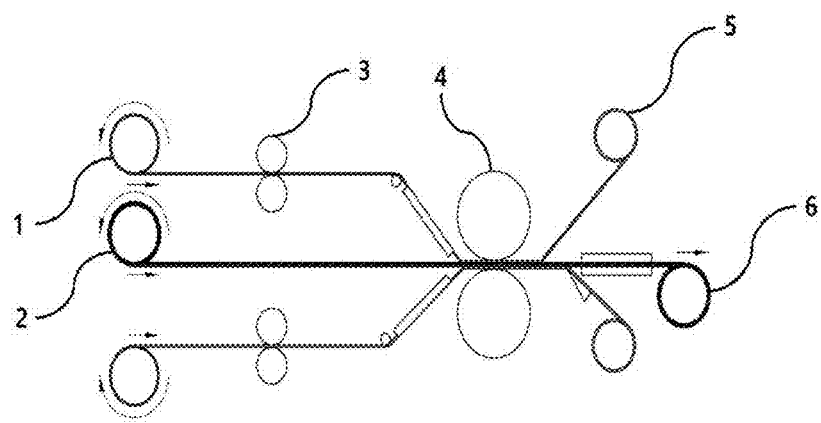
FIG. 1 shows a conventional apparatus for manufacturing a membrane electrode assembly.
Figure 2A:
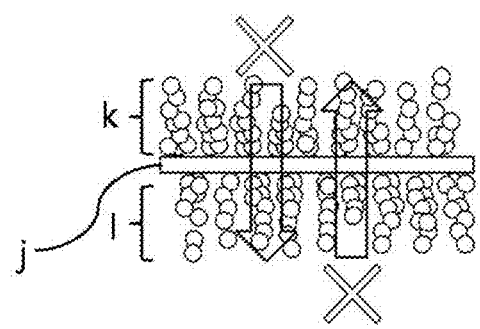
FIGS. 2A and 2B show technical difficulties in conventional membrane electrode assemblies.
Figure 2B:
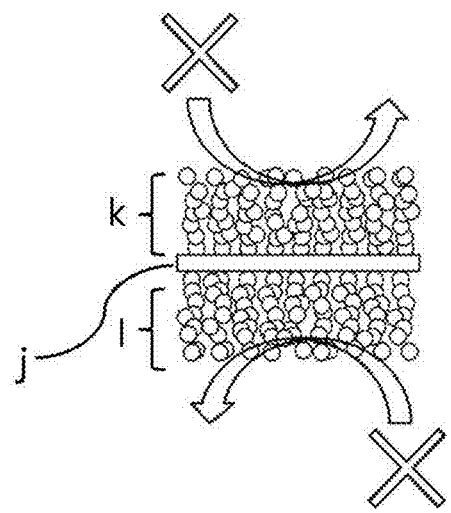

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, terms, such as "including", "having", etc., will be interpreted as indicating presence of characteristics, numbers, steps, operations, elements or parts stated in the specification or combinations thereof, and do not exclude presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 3:
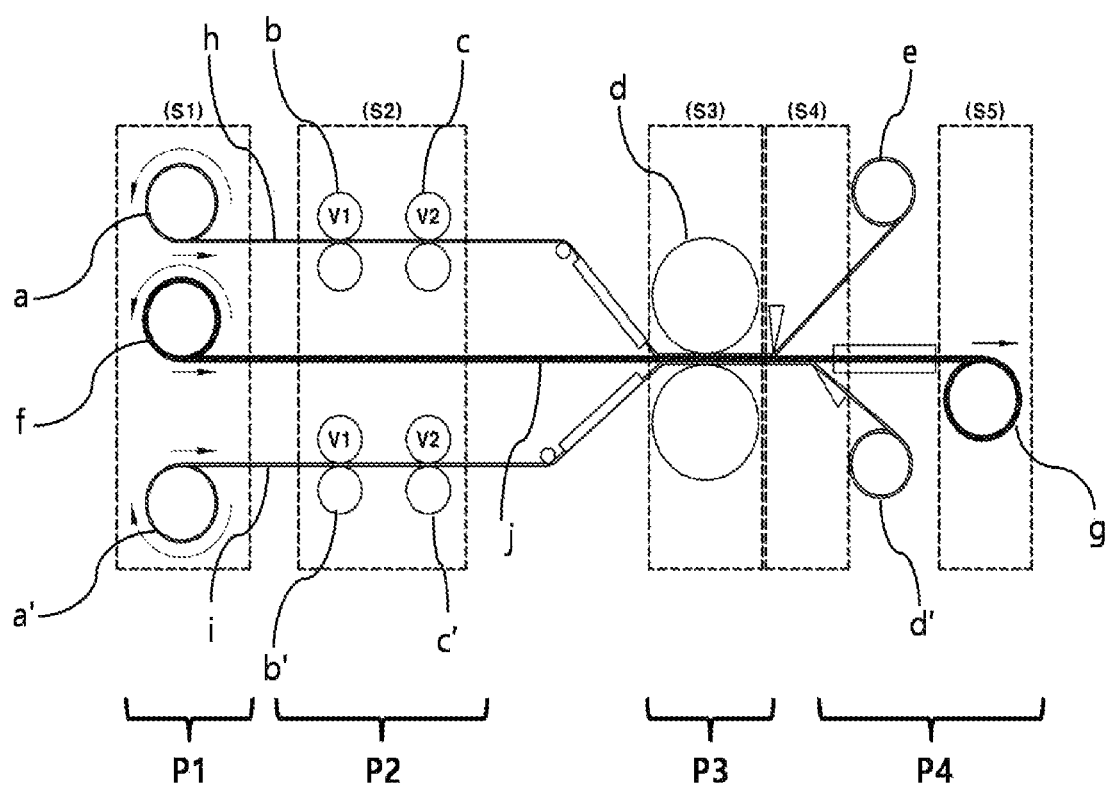
FIG. 3 shows an exemplary apparatus for manufacturing a membrane electrode assembly and its operating parts (P1-P4) according to an exemplary embodiment of the present invention.

Provided is an apparatus of manufacturing a membrane electrode assembly which may provide electrodes having a continuous porosity gradient in a thickness direction during a membrane and electrode bonding process. For this purpose, FIG. 3 illustrates an exemplary apparatus of manufacturing an exemplary membrane electrode assembly according to an exemplary embodiment of the present invention. For example, an exemplary manufacturing apparatus may include a feeding part P1, an elongating part P2, a thermal compressing part P3 and a winding part P4. The feeding part P1 may include a cathode feeding roller configured to feed a first release paper h to which a cathode material a is attached; an anode feeding roller a' configured to feed a second release paper i to which a anode material is attached; and an electrolyte membrane configured to feed a roller f interposed between the cathode feeding roller a; and the anode feeding roller a' for configured to feed an electrolyte membrane j. The elongating part P2 may include a pair of first cathode elongating rollers b configured to receive a first release paper h from the cathode feeding roller a; a pair of second cathode elongating rollers c configured to receive a first release paper h from the pair of first cathode elongating rollers b; a pair of first anode elongating rollers b' configured to receive a second release paper i from the anode feeding rollers a'; and a pair of second anode elongating rollers c' configured to receive a second release paper i from the pair of first anode elongating rollers b'. The thermal compressing part P3 may include a pair of thermal compressing rollers d configured to form the membrane electrode assembly by compressing the cathode material k attached on the first release paper h received from the second cathode elongating roller c, the anode material l attached on the second release paper i received from the second anode elongating roller c' and the electrolyte membrane j fed from the electrolyte membrane feeding roller f. Preferably, heat may be applied during compressing the cathode material k attached on the first release paper h received from the second cathode elongating roller c The winding part P4 may include a cathode winding roller e configured to remove a first release paper from the membrane electrode assembly received from the thermal compressing part P3; an anode winding roller d' configured to remove a second release paper from the membrane electrode assembly; and a membrane electrode assembly winding roller g configured to wind the membrane electrode assembly on which first release paper and second release paper have been removed. Preferably, porous release films may be include the first release paper and the second release paper (hereinafter referred to as release papers). Further, flexible films having flexibility may be used as the release papers. The porosity of the release papers may promote binding of the release paper to the electrode (or electrode material) during a drawing operation, and the flexibility from the flexible films may promote drawing of the release paper and thus to draw the electrode together with the release paper.

The release papers having the above characteristics may suitably include one or more selected from the group consisting of polytetrafluoroethylene (PTFE), expanded polytetrafluoroethylene (e-PTFE), polyethylene terephthalate (PET), polyethylene naphthalate (PEN), polyimide (PI) and polyoxymethylene (POM). For example, the porous release film or the release paper may include two or more materials selected from the above-described group are adhered to each other.

The cathode material from the feeding part may be adhered to the surface facing the electrolyte membrane of the first release paper, and the anode material may be adhered to the surface facing the electrolyte membrane of the second release paper. The pair of first cathode elongating rollers and the pair of first anode elongating rollers in the elongating part may be driven at a rotational speed V1, and the pair of second cathode elongating rollers and the pair of second anode elongating rollers may be driven at a rotational speed V2.

In the present invention, the rotational speed V2 may be greater than the rotational speed V1.

Further provided is a method of manufacturing a membrane electrode assembly.

In the method of manufacturing a membrane electrode assembly according to an exemplary embodiment of the present invention, a porosity gradient may be continuously imparted to electrodes in a thickness direction so as to improve reactivity with external gas and transfer of internal ions.

Preferably, the manufacturing method may include drawing release papers (e.g., first release paper or second release paper) provided with electrodes adhered thereto through draft rollers (e.g., first and second cathode elongating rollers or first and second anode elongating rollers) to increase porosity of the electrodes, transferring the electrodes to an electrolyte membrane by compressing the electrodes (e.g., cathode material or anode material) and the electrolyte membrane after the electrolyte membrane is located so as to face the electrodes adhered to the release papers, and forming the membrane electrode assembly. Preferably, the electrodes of the membrane electrode assembly may have a porosity gradient in the thickness direction, by removing the release papers from the electrodes, and the porosity of the electrodes at the interfaces between the electrolyte membrane and the electrodes may be decreased in the transfer of the electrodes to the electrolyte membrane. Preferably, heat may be applied during the compressing.

FIG. 3 illustrates exemplary operations of the manufacturing process according to an exemplary embodiment of the present invention. Although FIG. 3 illustrates a conventional roll-to-roll decal method and a conventional roll-pressing method, the manufacturing method of the present invention is not limited thereto and may be used to manufacture a membrane electrode assembly through a flat panel pressing method according to respective sheets other than the roll-to-roll decal method.

For example, as shown in FIG. 3, the respective operations of the manufacturing process may include feeding the electrodes and the electrolyte membrane (Operation S1), drawing the electrodes (Operation S2), transferring the electrodes to the electrolyte membrane (Operation S3), removing the release papers from the electrodes (Operation S4), and winding an obtained membrane electrode assembly (Operation S5).

Hereinafter, the respective operations of the manufacturing method according to exemplary embodiments of the present invention will be described in more detail based on a process flow shown in FIG. 3 and change in porosity of the electrodes in the respective operations shown in FIG. 4.

Feed of Electrodes and Electrolyte Membrane (Operation S1)

The electrodes (cathode material or anode material) k and l adhered to the release papers (first release paper or second release paper) h and i may be fed through the electrode feed rollers (cathode feeding roller or anode feeding roller) a and a', and the electrolyte membrane j may be fed through the electrolyte membrane feed roller f. As shown in FIG. 4, in this operation, no artificial change may be applied to pores of the electrodes k and l and the electrodes may have a uniform pore size depending on the size of catalyst particles constituting the electrodes. Further, the electrodes k and l at this time may be adhered to the surface of the release papers h and I facing the electrolyte membrane j, and the electrodes k and l adhered to the respective release papers h and I by thermocompression thereafter may be bonded and compressed to the electrolyte membrane j.

Drawing of Electrodes (Operation S2)

The electrodes k and l adhered to the release papers h and i may be drawn by drawing the release papers h and i, fed through the electrode feed rollers a and a', through the draft rollers b, c, b' and c'. As shown in FIG. 3, an example of performing elongating in the cathode will be provided. The example provided is not limited to the cathode and the same process may be performed in the anode. The first release paper h fed to a pair of upper and lower first cathode elongating rollers b having the rotational speed V1 from the cathode feed roller a may be drawn via a pair of upper and lower second cathode feed elongating rollers c having the rotational speed V2. Here, the drawing of the release papers may be performed using a difference between the rotational speed V1 and rotational speed V2.

Particularly, a speed ratio (V1/V2) of the rotational speed V1 to the rotational speed V2 may be of about 1/1.2 to 1/10.0. Here, when the V2 may be less than or equal to the V1, drawing of the release papers in the feeding direction of the first release paper h (i.e., the length direction of the release papers or a machine direction (MD)) may not be performed.

An elongation ratio of the first release paper h may be directly proportional to the speed ratio (V1/V2) of the first cathode elongating roller b and the second cathode elongating roller c. Preferably, the elongation ratio may be 1:1.2 to 1:10.0.

In addition, a distance between the first cathode elongating roller b having the rotational speed V1 and the second cathode elongating rollers c having the rotational speed V2 may be about 5 cm to 100 cm.

The cathode material k adhered to the first release paper h may be drawn through drawing of the first release paper h.

Due to drawing of the cathode material k, the size of pores of the cathode material k, generated according to the particle size of a catalyst may be increased. For example, as the cathode material k may be drawn, porosity of the cathode material k may be increased.

The size of the pores of the electrodes, increased due to drawing of the electrodes, may range from about 40 nm to 200 nm, or particularly of about 100 nm to 200 nm.

Figure 4:
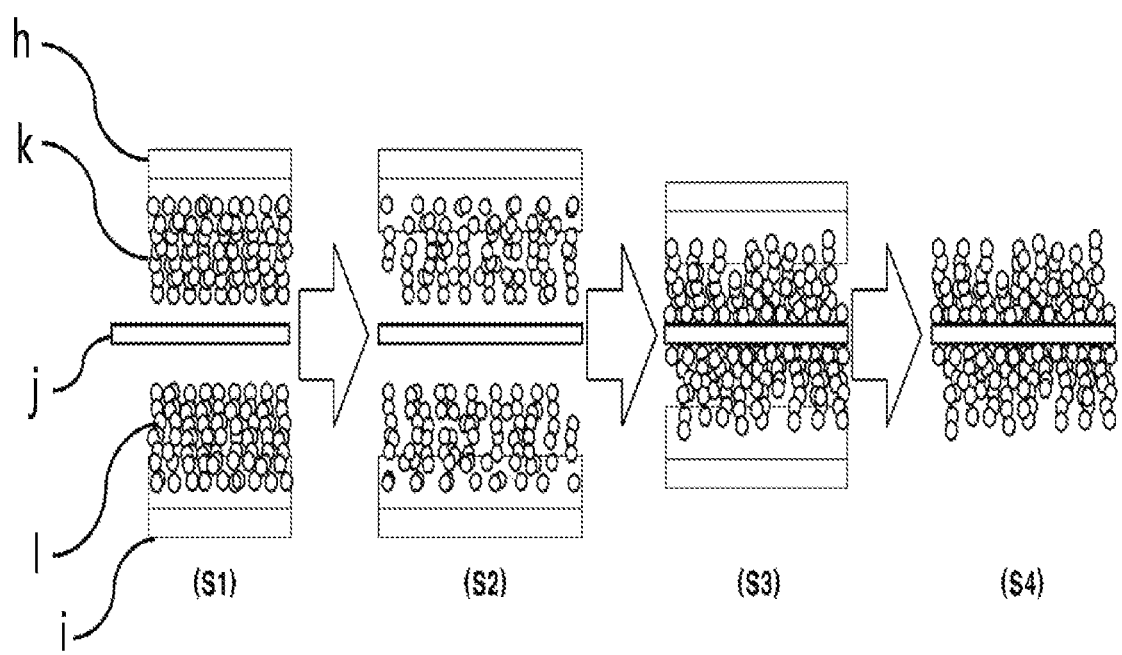
FIG. 4 shows exemplary operations of a process of imparting a porosity gradient to electrodes in a thickness direction according to an exemplary embodiment of the present invention.

As shown in FIG. 4, the electrodes k and l were drawn due to drawing of the release papers h and i and porosity was increased as intervals between the catalyst particles constituting the electrodes k and l were increased. Since the electrodes k and l were adhered to the release papers h and i, porosity of the electrodes may not be decreased again to their original state.

Transfer of Electrodes to Electrolyte Membrane (Operation S3)

The electrodes k and l adhered to the release papers h and i, drawn in Operation S2, and the electrolyte membrane j may be fed to the thermocompression rollers d and thermally compressed by the thermocompression rollers d.

The cathode material k adhered to the first release paper h facing one surface of the electrolyte membrane j and the anode material l adhered to the second release paper facing the other surface of the electrolyte membrane j may be thermally compressed facing one another.

For example, the cathode material k fed from the second cathode elongating roller c of the manufacturing apparatus and the anode material l fed from the second anode elongating roller c' of the manufacturing apparatus may be input to a space between the thermocompression rollers d under the condition that the electrolyte membrane j may be interposed between the cathode and anode materials.

Particularly, the thermocompression rollers d may apply heat and compress the electrodes k and l adhered to the release papers in the drawn state and the electrolyte membrane j fed from the electrolyte membrane feed roller f, thus forming a membrane electrode assembly.

As shown in FIG. 4, structures of the catalyst particles located on the surfaces of the electrodes contacting the electrolyte membrane j may collapse by thermocompression and thus pores of the electrodes may be decreased.

For example, the surfaces of the electrodes adhered to the release papers h and i may maintain a state in which porosity may be increased by drawing of the electrodes, but porosity of the surfaces of the electrodes contacting the electrolyte membrane j may be decreased.

An average pore size of the surfaces (inner surfaces) of the electrodes having decreased porosity may range from about 1 nm to about 60 nm, or particularly, from about 1 nm to about 40 nm.

A catalyst slurry may be applied to the surfaces of the electrolyte membrane j and thus form coating layers, before thermocompression of the electrodes k and l and the electrolyte membrane j by the thermocompression rollers d.

A catalyst material constituting the catalyst slurry may be the same as the catalyst material constituting the electrodes k and l.

Preferably, a pore size of the coating layers formed on the surfaces of the electrolyte membrane may range from about 1 nm to about 50 nm, or particularly, from about 1 nm to about 40 nm.

Removal of Release Papers (Operation S4)

The electrodes k and l adhered to the release papers h and i in the drawn state and the electrolyte membrane j fed from the electrolyte membrane feed roller f may be thermally compressed so that the electrodes k and l adhered to the release papers h and i may be transferred to the electrolyte membrane j so as to form a membrane electrode assembly and, simultaneously, to remove the release papers h and i.

In the present invention, the removed release papers h and i may be collected by winding rollers (cathode winding roller or anode winding roller) e and d'.

Structures of the catalyst particles of the outer surfaces of the electrodes k and l contacting the release papers h and i may be maintained even if the release papers h and i are removed. Preferably, the porosity of the outer surfaces of the electrodes k and l may maintain the increased state after removal of the release papers h and i.

The porosity of the outer surfaces of the electrodes k and l, from which the release papers h and i are removed, may be greater than porosity of the inner surfaces of the electrodes k and l contacting the electrolyte membrane j.

For example, porosity of the entirety of the electrodes k and l may be increased by drawing of the release papers h and i in Operation S2 and thereafter, porosity of the inner surfaces of the electrodes k and l contacting the electrolyte membrane j may be decreased by thermocompression in Operation S3 but porosity of the outer surfaces of the electrodes k and l contacting the release papers h and i due to adhesive force therebetween may not be decreased. After thermocompression, porosity of the surfaces of the membrane electrode assembly may maintain the increased state.

Preferably, an average pore size of the outer surfaces of the electrodes k and l may range from about 40 nm to about 200 nm, and an average pore size of the inner surfaces of the electrodes k and l may range from about 1 nm to about 60 nm. Particularly, the average pore size of the outer surfaces of the electrodes k and l may range from about 100 nm to about 200 nm, and the average pore size of the inner surfaces of the electrodes k and l may range from about 1 nm to about 40 nm.

As shown in FIG. 4, porosity of the outer surfaces of the electrodes k and l, exposed to the outside by removing the release papers h and i, may be maintained without decrease.

Preferably, electrodes k and l may have a continuous porosity gradient in a thickness direction.

Figure 5:
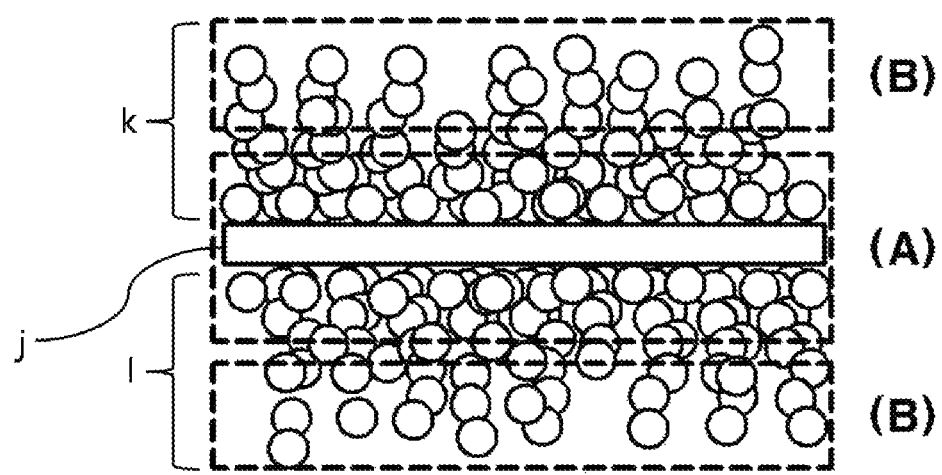
FIG. 5 shows porosity differences in an exemplary membrane electrode assembly according to an exemplary embodiment of the present invention.

As shown in the FIG. 5, the inner surface regions A of the electrodes k and l contacting the electrolyte membrane j and outer surface regions B of the electrodes k and l exposed to the outside by removing the release papers have different porosities.

Preferably, a density of catalyst particles constituting the inner surface regions A of the electrodes k and l may be increased, thus, hydrogen ions supplied from a cathode of a fuel cell may pass through the electrolyte membrane j and be effectively moved to an anode, thereby suppressing crossover phenomenon.

Further, since the density of the catalyst particles constituting the inner surface regions A of the electrodes k and l is increased, the interfaces between the electrolyte membrane j and the electrodes k and l may have a densified structure and thereby durability of the interfaces may be increased.

On the other hand, a density of catalyst particles constituting the outer surface regions B of the electrodes k and l may be reduced and, thus, the outer surface regions B may have greater porosity than that of the inner surface regions A. Therefore, exchange and reaction of the fuel cell with gas (hydrogen and oxygen) supplied from the outside of the fuel cell may be increased and, thus, the membrane electrode assembly may be advantageous in mass transfer. Particularly, loss of mass transfer in a high output range (1 $A/cm^2$) may be reduced.

Winding of Membrane Electrode Assembly (Operation S5)

The membrane electrode assembly having a three-layer structure including the electrodes k and l and the electrolyte membrane j by removing the release papers h and i may be collected by the winding roller g.

Although the present invention describes various exemplary membrane electrode assemblies as having the three-layer structure, the membrane electrode assembly may have a structure having five or more layers by additionally forming catalyst layers between the electrodes k and l and the electrolyte membrane j, as needed.

As is apparent from the above description, in a manufacturing apparatus of a membrane electrode assembly and a manufacturing method of a membrane electrode assembly using the same in accordance with various exemplary embodiments of the present invention, the interfaces between electrodes and an electrolyte membrane may be densified and thus durability of the interfaces may be increased. Further, a porosity gradient may be continuously imparted to outer surfaces and inner surfaces of the electrodes and, thus, reactivity of the outer surfaces of the electrodes with substances, such as oxygen, hydrogen, and the like, may be increased and mass transfer of hydrogen, and the like, in the inner surfaces of the electrodes may be effectively performed.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly, comprising:
   drawing release papers provided with electrodes adhered thereto through draft rollers to increase porosity of the electrodes;
   transferring the electrodes to an electrolyte membrane by compressing the electrodes and the electrolyte membrane after the electrolyte membrane is located so as to face the electrodes adhered to the release papers; and
   forming the membrane electrode assembly, having the electrodes with a porosity gradient in a thickness direction, by removing the release papers from the electrodes,
   wherein porosity of the electrodes at the interfaces between the electrolyte membrane and the electrodes is decreased in the transfer of the electrodes to the electrolyte membrane,
   wherein in the transferring the electrodes to the electrolyte membrane, porosity of the electrodes is increased in a direction from regions of the electrodes contacting the electrolyte membrane to regions of the electrodes contacting the release papers.

2. The method of claim 1, wherein heat is applied when the electrodes and the electrolyte membrane are compressed.

3. The method of claim 1, wherein the release papers comprise one or more selected from the group consisting of polytetrafluoroethylene (PTFE), expanded polytetrafluoroethylene (e-PTFE), polyethylene terephthalate (PET), polyethylene naphthalate (PEN), polyimide (PI) and polyoxymethylene (POM).

4. The method of claim 1, wherein, in the drawing of the release papers, the release papers are drawn in a length direction (a machine direction (MD)).

5. The method of claim 1, wherein, in the drawing of the release papers, the release papers are drawn by the draft rollers driven at a rotational speed V1 and the draft rollers are driven at a rotational speed V2.

6. The method of claim 5, wherein a speed ratio (V1/V2) of the rotational speed V1 to the rotational speed V2 is about 1/1.2 to 1/10.0.

7. The method of claim 1, wherein, in the drawing of the release papers, an elongation ratio of the release papers is about 1:1.2 to 1:10.0.

8. The method of claim 1, wherein, in the formation of the membrane electrode assembly, porosity of outer surfaces of the electrodes, from which the release papers are removed, is greater than porosity of inner surfaces of the electrodes contacting the electrolyte membrane.

9. The method of claim 8, wherein, in the formation of the membrane electrode assembly, an average pore size of the outer surfaces of the electrodes, from which the release papers are removed, is about 40 nm to 200 nm, and an average pore size of the inner surfaces of the electrodes contacting the electrolyte membrane is about 1 nm to 60 nm.

10. The method of claim 1, wherein, in the formation of the membrane electrode assembly, the electrodes have a continuous porosity gradient in a thickness direction.

11. The method of claim 1, wherein porosity of regions of the electrodes contacting the release papers maintains an increased state, in the transfer of the electrodes to the electrolyte membrane.

12. The method of claim 1, further comprising applying a catalyst slurry to surfaces of the electrolyte membrane, before the transfer of the electrodes to the electrolyte membrane.

13. The method of claim 12, wherein a catalyst material of the applied catalyst slurry is the same as a catalyst material of the electrodes.

* * * * *